US007630687B2

(12) United States Patent
Madhavan et al.

(10) Patent No.: US 7,630,687 B2
(45) Date of Patent: Dec. 8, 2009

(54) EXTENSIBLE FRAMEWORK FOR MITIGATING INTERFERENCE PROBLEMS IN WIRELESS NETWORKING

(75) Inventors: Poovanpilli G. Madhavan, Bellevue, WA (US); Abhishek Abhishek, Woodinville, WA (US); Victoria M. Poncini, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 534 days.

(21) Appl. No.: 11/004,288

(22) Filed: Dec. 3, 2004

(65) Prior Publication Data

US 2006/0121853 A1 Jun. 8, 2006

(51) Int. Cl.
*H04B 1/00* (2006.01)
(52) U.S. Cl. .................................. 455/63.1; 455/67.13
(58) Field of Classification Search ....... 455/63.1–63.3, 455/67.11, 67.13, 226.1
See application file for complete search history.

(56) References Cited

U.S. PATENT DOCUMENTS

| 3,976,981 | A | 8/1976 | Bowden |
| 5,787,131 | A | 7/1998 | Bottomley |
| 5,796,788 | A | 8/1998 | Bottomley |
| 5,802,076 | A | 9/1998 | Weigand |
| 5,822,372 | A | 10/1998 | Emami |
| 6,473,410 | B1 | 10/2002 | Sakoda |
| 6,560,463 | B1 | 5/2003 | Santhoff |
| 6,628,626 | B1 | 9/2003 | Norgaard |
| 6,836,673 | B1 | 12/2004 | Trott |
| 6,842,621 | B2 | 1/2005 | Labun |
| 6,999,438 | B2 | 2/2006 | Nounin |
| 7,027,827 | B2 | 4/2006 | Bonta |
| 7,035,593 | B2 * | 4/2006 | Miller et al. ............. 455/67.11 |
| 7,035,670 | B2 | 4/2006 | Kikuma |
| 7,072,582 | B2 | 7/2006 | Stevens |

(Continued)

FOREIGN PATENT DOCUMENTS

EP 1065897 1/2001

(Continued)

OTHER PUBLICATIONS

Office Action dated Mar. 7, 2007 cited in related U.S. Appl. No. 11/004,600.

(Continued)

*Primary Examiner*—Raymond S Dean
(74) *Attorney, Agent, or Firm*—Workman Nydegger

(57) ABSTRACT

Described is an architecture comprising a flexible and extensible framework embodied in a robust coexistence service that couples sensed RF spectrum (interference) data to modules that process the data into dynamic feedback information used to mitigate network communication problems caused by the interference. Via a driver, spectrum sensor hardware is connected to the framework running on a computing device, where the condition and quality of various wireless networking channels are assessed by external modules plugged into the framework. Modules comprise include a classifier component that examines the sensed-data and classifies it, and an application program that processes the classified data, possibly for mitigation. Mitigation-related information is fed to a feedback mechanism to adjust network parameters to avoid the sensed interference. The robust coexistence service also distributes control data corresponding to the mitigation information to other remote computing devices in the wireless network for use in mitigating their interference problems.

23 Claims, 10 Drawing Sheets

U.S. PATENT DOCUMENTS

| | | | |
|---|---|---|---|
| 7,075,906 B2 | 7/2006 | Douglas | |
| 7,079,812 B2 | 7/2006 | Miller | |
| 7,116,943 B2 * | 10/2006 | Sugar et al. | 455/67.11 |
| 7,127,250 B2 | 10/2006 | Gallagher | |
| 7,167,708 B2 | 1/2007 | Backes | |
| 7,187,925 B2 | 3/2007 | Abhishek | |
| 7,254,372 B2 | 8/2007 | Janusz | |
| 7,269,151 B2 | 9/2007 | Diener | |
| 7,283,492 B2 | 10/2007 | Malladi | |
| 7,308,263 B2 | 12/2007 | Gallagher | |
| 7,339,947 B2 | 3/2008 | Hammel | |
| 7,424,269 B2 | 9/2008 | Trainin | |
| 2002/0173271 A1 | 11/2002 | Blair et al. | |
| 2003/0125019 A1 | 7/2003 | Bajikar | |
| 2004/0001530 A1 | 1/2004 | Lyle | |
| 2004/0022223 A1 | 2/2004 | Billhartz | |
| 2004/0054774 A1 | 3/2004 | Barber et al. | |
| 2004/0077355 A1 | 4/2004 | Kermik | |
| 2004/0077356 A1 | 4/2004 | Kermik | |
| 2004/0085896 A1 | 5/2004 | Banerjea | |
| 2004/0137849 A1 | 7/2004 | Kloper | |
| 2004/0147223 A1 | 7/2004 | Cho | |
| 2004/0203461 A1 | 10/2004 | Hay | |
| 2004/0203737 A1 | 10/2004 | Myhre | |
| 2004/0203800 A1 | 10/2004 | Myhre | |
| 2004/0203815 A1 | 10/2004 | Shoemake et al. | |
| 2004/0240525 A1 | 12/2004 | Karabinis | |
| 2004/0259589 A1 | 12/2004 | Bahl | |
| 2005/0003827 A1 | 1/2005 | Whelan | |
| 2005/0021621 A1 | 1/2005 | Welch | |
| 2005/0070294 A1 | 3/2005 | Lyle | |
| 2005/0100119 A1 | 5/2005 | Husted | |
| 2005/0111383 A1 | 5/2005 | Grob | |
| 2005/0122999 A1 | 6/2005 | Scherzer | |
| 2005/0143123 A1 | 6/2005 | Black | |
| 2005/0163042 A1 * | 7/2005 | Roberts | 370/208 |
| 2005/0181823 A1 | 8/2005 | Haartsen | |
| 2005/0207395 A1 | 9/2005 | Mohammed | |
| 2006/0120302 A1 | 6/2006 | Poncini | |
| 2006/0121854 A1 | 6/2006 | Abhishek | |
| 2006/0217067 A1 | 9/2006 | Helbig | |
| 2006/0251012 A1 | 11/2006 | Hara | |
| 2007/0105501 A1 | 5/2007 | Shen | |

FOREIGN PATENT DOCUMENTS

| | | |
|---|---|---|
| EP | 1411685 | 4/2004 |
| WO | 03-001742 | 1/2003 |
| WO | WO 2004/077724 A | 9/2004 |

OTHER PUBLICATIONS

Office Action dated Aug. 23, 2007 cited in related U.S. Appl. No. 11/004,600.

Office Action dated Feb. 8, 2008 cited in related U.S. Appl. No. 11/004,600.

Office Action dated Apr. 28, 2008 cited in related U.S. Appl. No. 11/004,428.

On the Union of WPAN in Mobile Computers and Hand-Held Devices, http://www.intel.com/technology/itj/2003/volume07issue03/art03/union/p07_solutions.htm, Feb. 2003.

Ciscoworks Wireless LAN Solution Engine Release 2.5, http://www.cisco.com/application/pdf/en/us/guest/products/ps/5297/c1037ccmigration_09186a0080184947.pdf, Apr. 2004.

The Cogino Intelligent Spectrum Management (TM) System Mobile, http://www.cogino.com/pdf/isms_mobile_72dpi.pdf, Apr. 2005.

Notice of Allowance dated Aug. 13, 2008 cited in U.S. Appl. No. 11/004,600.

Notice of Allowance dated Sep. 23, 2008 cited in U.S. Appl. No. 11/004,428.

Office Action dated Mar. 19, 2009 cited in U.S. Appl. No. 11/267,458.

* cited by examiner

EXTENSIBLE FRAMEWORK FOR MITIGATING INTERFERENCE PROBLEMS IN WIRELESS NETWORKING

CROSS-REFERENCE TO RELATED APPLICATIONS

The present invention is related to the following copending United States patent applications filed concurrently herewith, assigned to the assignee of the present invention, and hereby incorporated by reference in their entireties:

"Protocol for Exchanging Control Data to Mitigate Interference Problems in Wireless Networking," U.S. patent application Ser. No. 11/004,428; and "Use of Separate Control Channel to Mitigate Interference Problems in Wireless Networking," U.S. patent application Ser. No. 11/004,600.

FIELD OF THE INVENTION

The invention relates generally to computer systems, and more particularly to wireless networks for computer systems.

BACKGROUND

Wireless local area networks (WLANs) are proliferating in both home and enterprises. Such wireless networks may be used for web browsing, file transferring, audiovisual streaming, sending and receiving messages, and other purposes. As wireless connectivity spreads, the likelihood of radio frequency (RF) activity from other bands and overlaying bands used in wireless networking bands increases for any given location, resulting in interference for a greater percentage of wireless network users.

Further, because wireless networks operate in unlicensed bands in the 2.4 GHz and 5 GHz regions of the RF spectrum, many other RF devices transmit information (or noise) on these frequencies as well, causing interference to the WLAN communication. Examples of various sources and types of interference seen by a home wireless network may include microwave ovens, which cause slow periodic interference; cordless phones, which cause interference of a type referred to as "slow hopper;" a Bluetooth headset (causing fast hopper interference); digital spread spectrum (DSS) cordless phones, which cause constant custom waveform interference; and wireless surveillance cameras, which cause constant standard waveform interference. In addition, other nearby WLANs operating on the same channel, such as that of a neighbor, can cause interference.

As is understood, RF interference in wireless networking results in an effective reduction of available data rates and/or range, causing poor user experience. While a technically-knowledgeable user may be able to mitigate a regularly occurring interference problem by reconfiguring networking devices to operate on another channel, many of the sources of interference transmit intermittently, whereby even if one problem was solved by changing to another channel, another problem might arise that occurs intermittently, which is more difficult to detect and resolve.

What is needed is a solution that provides for a reasonably good wireless experience and increases overall capacity of wireless networking bands, including in the presence of RF interference. The solution should be flexible, extensible and not require technical knowledge on the part of the user.

SUMMARY OF THE INVENTION

Briefly, the present invention is directed towards a system and method in the form of a framework through which mechanisms that monitor RF signals can work with other mechanisms to mitigate wireless network communication problems caused by RF interference. Such mechanisms include interference processing modules such as RF sensors, RF signature analysis systems and self-correcting software modules.

In one implementation, the framework for interconnecting such interference processing modules comprises a service operating on a computer system, referred to as a robust coexistence service, which is directed to allowing wireless networks to coexist with various other RF sources that would otherwise interfere with network communications. In this implementation, the robust coexistence service is extensible and manageable, and provides interfaces to internal modules to connect the external interference processing modules to the computer operating system. Via the internal modules, independent hardware vendors and independent software vendors register drivers and other software components, and negotiate their needs and capabilities as appropriate, essentially providing vendors with a straightforward way to "plug into" the operating system and other plugged-in modules.

The framework allows the vendors to leverage the operating system's core functionality, thereby avoiding the need for significant software programming by vendors to enable a computer system to detect and process RF-related data. This results in consistent stability and robustness in the deployment of various solutions to mitigate the effects of interference. Further, because the robust coexistence service is extensible, vendors may implement new features that promote an enhanced user experience in a consistent manner.

The framework includes a local processing system component containing internal modules that interconnect and coordinate the operations of the various external modules that are plugged into the service, among other things to dynamically vary the wireless networking communications in a way that mitigates the problems caused by interference. The framework also includes an information distribution system that coordinates the communication of control data corresponding to the locally-sensed interference to other remote devices in the network that are running respective instances of the robust coexistence service. The information distribution system also receives remotely-sensed control data for use in local mitigation of interference-related problems.

RF sensing spectrum hardware provides sensed raw RF data to the local processing system via a driver and interface to an internal data provider module of the local processing system. The data provider module is coupled to a data classifier module via a robust coexistence service (RCS) engine, whereby the data classifier module provides the RF spectrum data to one or more classifiers that have registered with the data classifier module. A consumer module coupled to the data classifier module (via the RCS engine) receives the classified data and provides it with one or more application programs registered with the consumer module. The application programs process the classified data to take some action, such as to provide a viewable notification regarding interference and/or to adapt its behavior in some way, such as to send smaller images to reduce the amount of bandwidth needed.

In turn, interference mitigation-related information determined by the robust coexistence service is passed to a feedback module, from where it is communicated to networking components) via an interface/driver to control the network communication parameters to avoid the interference, e.g., by changing the communication frequency to another channel, changing the rate at which data is sent, changing the timing of sending data, and so forth. For example, a WLAN miniport driver or WLAN NIC may use the classified data along with internal WLAN data to determine a solution that mitigates the problems caused by the interference by adjusting the networking components' operating parameters, e.g., to switch the channel or the band, stay on the same channel and employ transmission dodging, employ fragmentation to reduce packet size (smaller packets have lower collision chances compared to larger packets and in case of a collision, the cost of retransmission is less due to smaller size of retransmission), and so forth.

Another subsystem component of the robust coexistence service comprises an information distribution service including a transport module that communicates interference information locally sensed at the computer system to other remote devices on the network, and receives similar information sensed remotely. The information distribution service includes a peer process that manages a peer table containing interference-related information, and performs tasks including peer discovery and peer feedback handling. Peer feedback may be used to leverage the interference-related information sensed at a remote RF environment for use in local mitigation.

Other advantages will become apparent from the following detailed description when taken in conjunction with the drawings, in which:

DETAILED DESCRIPTION

Exemplary Operating Environment

Figure 1:
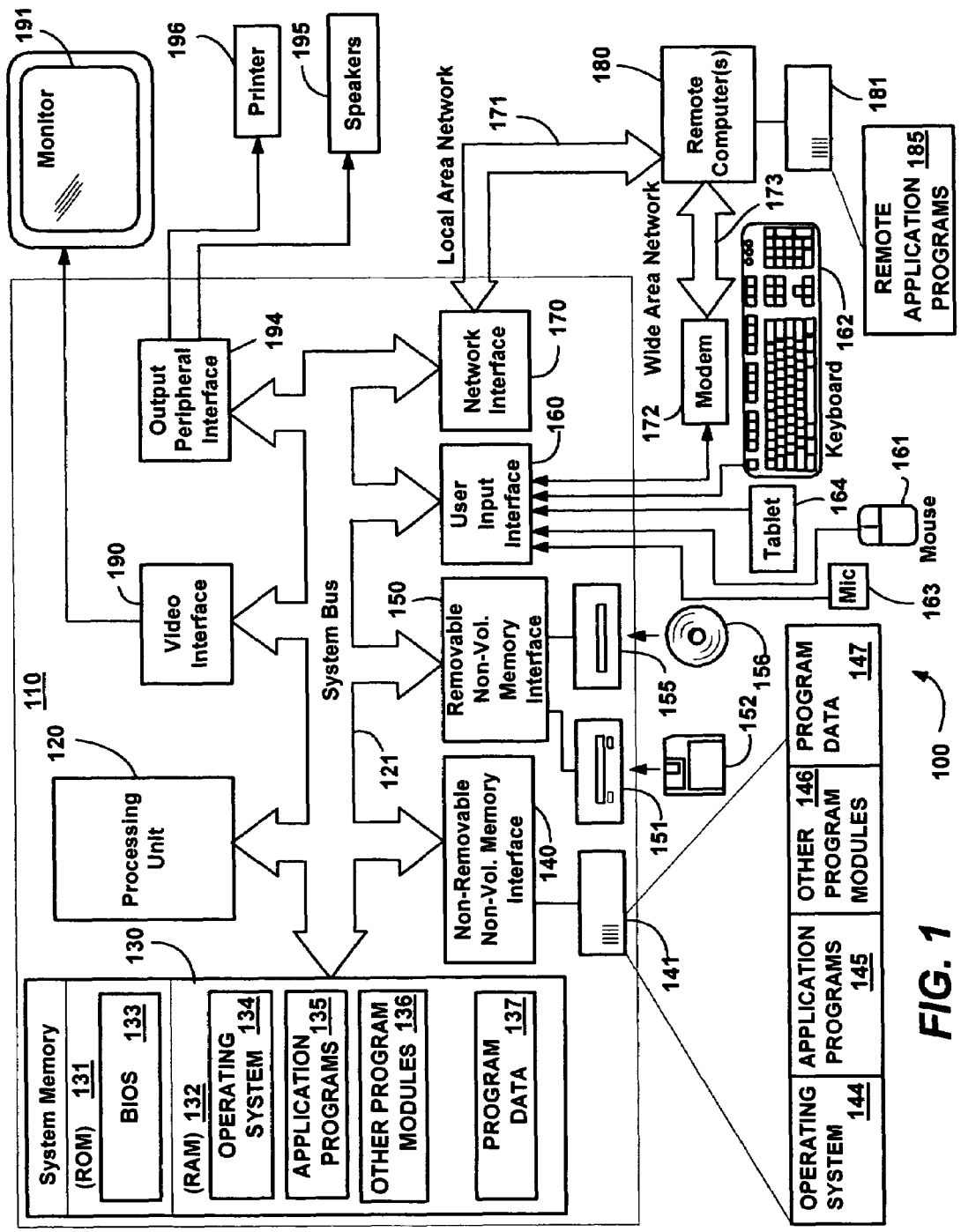
FIG. 1 is a block diagram generally representing a computing environment into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Robust Coexistence Service

The present invention is generally directed towards a flexible and extensible framework into which various (e.g., third party) hardware and software components interconnect to mitigate the problems caused by interference in the portion of the RF spectrum that is used for wireless network communications. As will be understood, numerous ways to implement the present invention are feasible, and only some of the alternatives are described herein. For example, the present invention is primarily described below with reference to components separated into modules for programming convenience, system stability, robustness and so forth. However, as can be readily appreciated, such modularization is not required, and at least some of the modules may be combined, and/or any given module may be further separated into more modules. Further, the framework allows for mitigation based on locally-sensed interference data and remotely-sensed interference data; however the invention provides benefits regardless of where the data is sensed. Moreover, the framework is primarily described herein as being run on a computer system, but alternatively may be adopted by hardware manufacturers for integration into an access point device, wireless bridge, and so forth. As such, the present invention is not limited to any of the particular examples used herein, but rather may be used various ways that provide benefits and advantages in computing in general.

Figure 2:
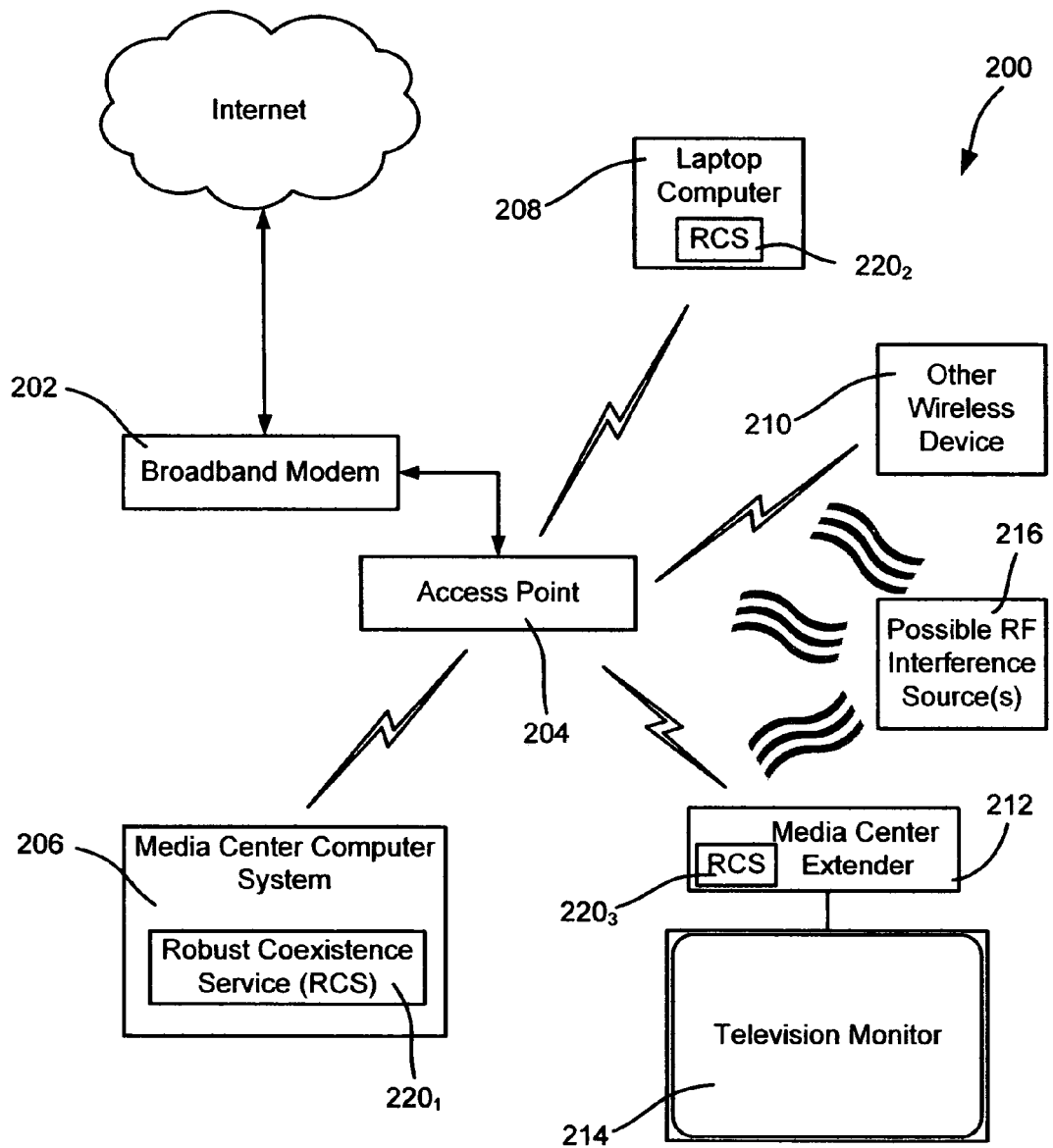
FIG. 2 is a block diagram generally representing an example wireless network including components running instances of the robust coexistence service, in accordance with various aspects of the present invention.

Turning to FIG. 2 of the drawings, there is shown an example wireless network 200 containing wireless devices such as may be found in a home networking environment, but may, of course be used in other environments, and also may be connected to a wired network device or devices. In the example network 200 of FIG. 2, a broadband modem 202 such as a cable modem or DSL modem receives and sends Internet data within the network 200. A wireless access point (wireless router) 204, ordinarily connected by a wired connection (directly or indirectly) to the broadband modem 202, couples the other wireless devices to the broadband router 204 and to one another.

The other wireless devices represented in FIG. 2 include a media computer system 206, a laptop computer 208, some other wireless device 210 such as a different laptop or desktop computer, and a media center extender 212 (similar to a set-top box) that couples audiovisual signals to a television monitor 214. Note that an alternative media center extender may be directly incorporated into the television monitor. FIG. 2 also shows a representation of one or more possible sources of RF interference 216, which may be essentially anything that generates RF transmissions that can cause interference with wireless network communications, whether intentionally operating in the same frequency range, such as with a cordless telephone, or because of noise that results as a side-effect of operating, such as with a microwave oven.

By way of example, consider that the media center 206 streams audiovisual content via the access point 204 to the media center extender 212. While the audiovisual data is being streamed, various non-networking RF sources 216 such as a cordless phone may interfere with the audiovisual stream. As can be readily appreciated, the stream may be interrupted or the bandwidth constrained to such an extent that the media center extender 212 exhausts any buffered data, whereby the user experience is that of a frozen, erratic or otherwise incorrect picture and/or sound. Occasional use of the interfering device, such as is typical with telephone usage patterns, is generally unpredictable and can be even more frustrating to the user.

In accordance with various aspects of the present invention, some of the wireless devices depicted in FIG. 2 include an instance of the robust coexistence service (RCS), shown in FIG. 2 as RCS instances $220_1$-$220_3$. As described below, the robust coexistence service provides a mechanism and framework by which the negative effects of RF interference on wireless networking may be dynamically mitigated to an extent, or possibly even eliminated, to thereby provide an improved user networking experience.

Figure 3:
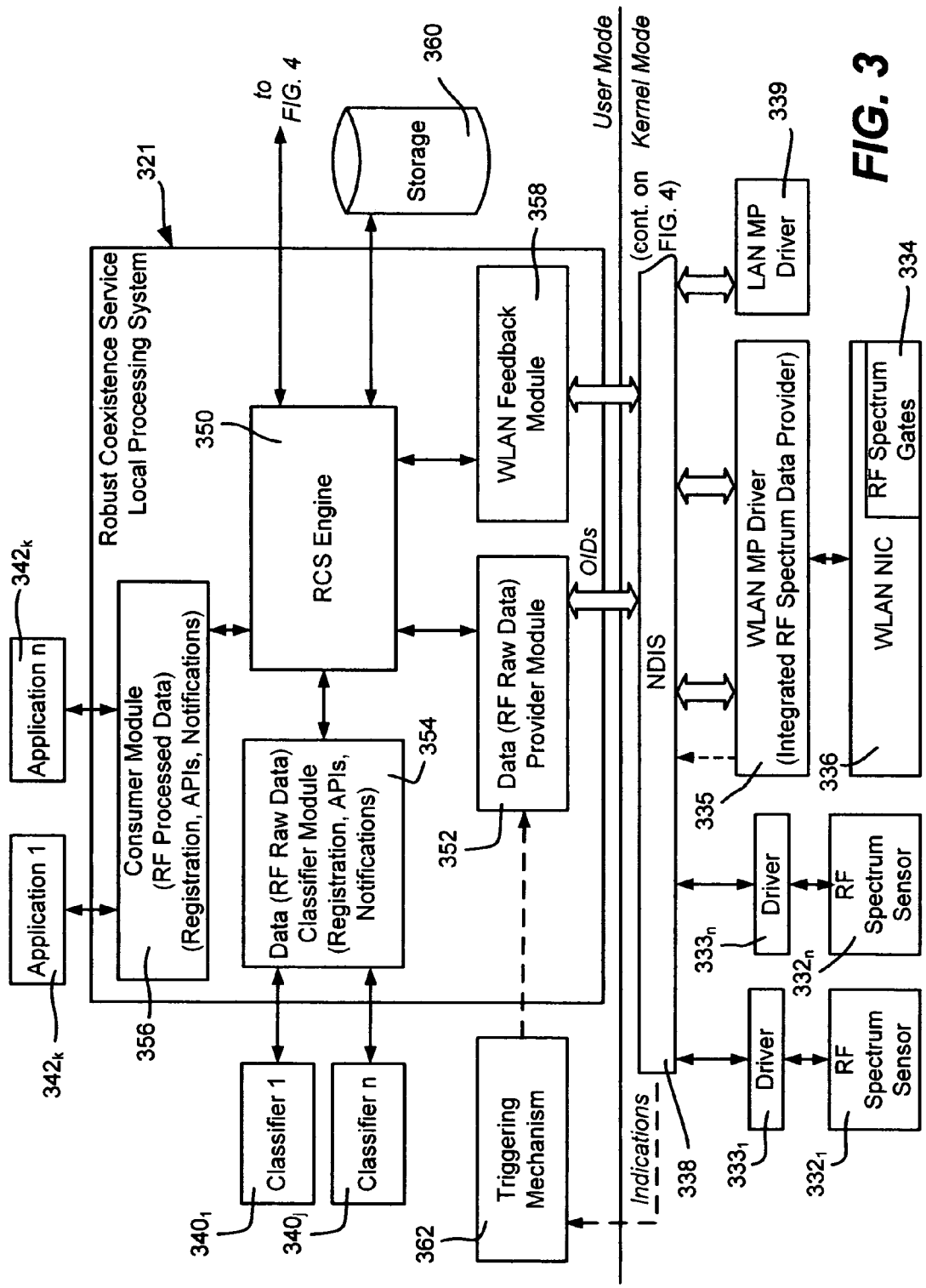
FIG. 3 is a block diagram generally representing components connected to local processing system components of the robust coexistence service, in accordance with various aspects of the present invention.

FIG. 3 shows one component subsystem of a robust coexistence service, referred to as a local processing system 321, along with the local processing system's internal modules and various other modules and resources to which it connects. In general, and as described below, the RCS local processing system 321 interconnects and coordinates the operations of the various external modules that are plugged into the robust coexistence service running on a network node, such as a computer system or an access point, in order to develop mitigation data that may be used to dynamically control the wireless networking components in a way that mitigates the problems caused by interference. To this end, the RCS local processing system 321 interconnects external modules that process spectrum data sensed by local spectrum hardware, e.g., stand-alone hardware and/or hardware intgrated into a WLAN chipset, and makes the processed information available for mitigation purposes. Another part of the robust coexistence service, referred to as an RCS information distribution system 421 and described with reference to FIG. 4, coordinates the communication of the control information to other remote devices that are running respective instances of the robust coexistence service, along with handling control information sensed at, processed and received from those remote devices. In other words, the RCS information distribution system 421 provides locally-obtained control data for use by any other remote robust coexistence service for interference mitigation purposes on its corresponding remote node, and obtains remotely-sensed control data for use by the local node for interference-related mitigation.

As represented in FIG. 3, in general, the RF sensing spectrum hardware provides sensed raw RF data to the local processing system 321. More particularly, the spectrum sensing hardware comprises one or more standalone spectrum chips (gates) $332_1$-$332_n$, and/or RF spectrum gates 334 embedded in the WLAN network interface card (NIC) 336 (or similar built-in circuitry), and coupled to an appropriate antenna or the like. As represented in FIG. 3, the spectrum hardware communicates the data via a respective corresponding driver $333_1$-$333_n$, and/or 335 to the local processing system 321, such as through the kernel mode NDIS (Network Driver Interface Specification) interface layer 338 or directly as a spectrum device kernel mode driver, which provides an interface to the user-mode RCS local processing system 321. Note that the robust coexistence service can also be implemented in kernel and also support kernel mode classifiers and kernel mode consumers. For completeness, FIG. 3 also shows a LAN miniport (MP) driver 339 for wired network connections. Note that also for completeness, FIG. 3 shows multiple sensors, e.g., the standalone sensors $332_1$-$332_n$ and their respective drivers $333_1$-$333_n$, along with the RF spectrum gates 334 and corresponding WLAN miniport driver 335 which includes an integrated RF spectrum data provider for handling the RF data; however it can be readily appreciated that more than one RF spectrum sensor is not needed in order to mitigate interference problems. Indeed, as will become apparent, no local sensor is needed on a given system if remotely-sensed RF control data is available to allow mitigation.

The RCS local processing system 321 provides interfaces to internal modules by which external modules, including classifiers $340_1$-$340_j$ and applications $342_1$-$342_k$, may register with the robust coexistence service 321. Note that the miniport drivers $333_1$-$333_n$ may be similarly pluggable through user mode software modules, and need not necessarily go through the NDIS layer 338. As part of registration, the various registering modules identify one or more various types of data that each supports, including data in a pre-defined, generic format understood by any classifier module, and/or data in a proprietary format (treated as blobs when routed to the corresponding classifier). The ability to use a proprietary format allows customized RF sensors and classifiers to be used in the framework. Data types may be a combination of pre-defined generic data and proprietary data type. A mapping is obtained (e.g., in the RCS engine 350) to relate the provider, classifier, consumer and driver in order to identify how a current set of information is to be processed. Identifiers may be used in routing custom data to the correct classifier, as can an evaluation as to whether at least part of the raw data is in the predefined format, in which event any classifier can consume at least part of the raw data. Alternatively, classifiers may receive and discard data they do not understand.

Within the RCS local processing system 321, an RCS engine 350 provides connectivity among its internal modules 352-358, generally routing data as appropriate, as described below. In general, the RCS engine 350 coordinates the activities of the various modules in the service, and also stores classifier data for future use, e.g., in a storage 360. For example, the storage 360 may preserve time-stamped interference classifier information events that may be used for historical analysis.

Via the layered mechanism described above, a data provider module 352 of the system 321 obtains the raw data sensed by the spectrum sensing hardware $332_1$-$332_n$, and/or 334, along with any raw RF data and other lower MAC (media access controller) and PHY (physical) layer device data. From there, the data provider module 352 transfers the raw data to the RCS engine 350 to be forwarded to an appropriate classifier or classifiers (e.g., based on the respective data type or types for which they have registered) for processing into classified data. In one implementation, the data provider module 352 and the drivers may use identifiers (e.g., OIDs or APIs) to pass the raw RF data for consumption by a corresponding classifier or classifiers. As can be readily appreciated, the use of a driver model provides extensibility, as various spectrum sensors may be connected via a corresponding driver, including new ones as developed.

Note that although not necessary to the present invention, the local processing system 321 may remain idle until needed, that is, until some RF interference is sensed. To awaken the local processing system 321 at the correct time, a triggering mechanism 362 may be used, comprising one or more components that monitor the NDIS layer 338 and provide indications of interference. Further, note that the triggering mechanism 362 may not awaken the local processing system 321 to initiate interference processing until some threshold level of interference is achieved.

To route the RF data to an appropriate classifier, the RCS engine 350 forwards the raw data to a data classifier module 354 of the local processing system 321. In general, the classifier module 354 communicates with the registered classifier or classifiers $340_1$-$340_j$, to provide the raw spectrum data thereto and return processed data, referred to as classified data, for further processing. Note that this also provides for extensibility, as new and/or improved classifiers can simply plug-in as they become available.

In turn, the external classifiers $340_1$-$340_j$, which comprise one or more pluggable modules, essentially look at the raw RF data to determine what is happening in the RF environment. To this end, the classifiers $340_1$-$340_j$, process the raw RF data to perform signature analysis and the like, possibly combining the RF data with other network traffic measurements, to identify the data's relevant characteristics and possibly the source of interference (e.g., cordless phone, microwave oven, Bluetooth device and so forth), and supply such classified data for further action.

A consumer module 356 of the local processing system 321 takes the classified data and (via the RCS engine 350) may store it in the storage 360 and/or route the classified data to registered application programs $342_1$-$342_k$, such as for enunciation of the detected interference as well as for higher-level processing to determine how to adapt the program to avoid the interference. To this end, one or more application programs register with the local processing system 321 to use the classified data to take some action, such as to provide a viewable notification or other indication regarding interference (e.g., a diagnostic application may prompt the user about an RF issue, such as "Cordless phone in use"), and/or, to determine a way to mitigate interference-related communication problems to some extent. For example, the classified data can be used by application programs such as an audio/video streaming application program to reduce the image size of an ongoing transmission, thereby transmitting a lesser amount of A/V streaming data. To this end, the application program may use the classified data as a hint for the application program to conduct its own tests to decide a due course of action in adjusting its behavior.

Note that one application program such as a diagnostic program may handle notifications, and another program may devise its own mitigation solution based on the classified data and any test results. Again, because of the plug-in model for application programs, the framework's extensibility characteristics are readily apparent. Also note that it is desirable to have mitigation decisions/actions occur relatively quickly, such as at present, on the order of under 100 milliseconds for audiovisual applications.

In turn, interference mitigation-related information determined by the robust coexistence service may be passed (e.g., via the RCS engine 350) to a feedback module 358, from where it is communicated to the WLAN miniport driver 335 (or the WLAN NIC 336) for performing dynamic upper-MAC and other adaptations that provide an interference mitigation solution. By way of example, the WLAN miniport driver 335 (or the WLAN NIC 336) can determine from the classified data and internal WLAN data that interference-related problems may be mitigated by changing the frequency to another channel, changing the rate at which data is sent, changing the timing of sending data (such as to avoid interference that starts and stops in a predictable pattern), and in other ways, including combinations of channel, rate and/or timing solutions, switching to another band, staying on the same channel while employing transmission dodging, employing fragmentation to reduce packet size (smaller packets have lower collision chances compared to larger packets and in case of a collision, the cost of retransmission is less due to smaller size of retransmission), and so forth.

Figure 4:
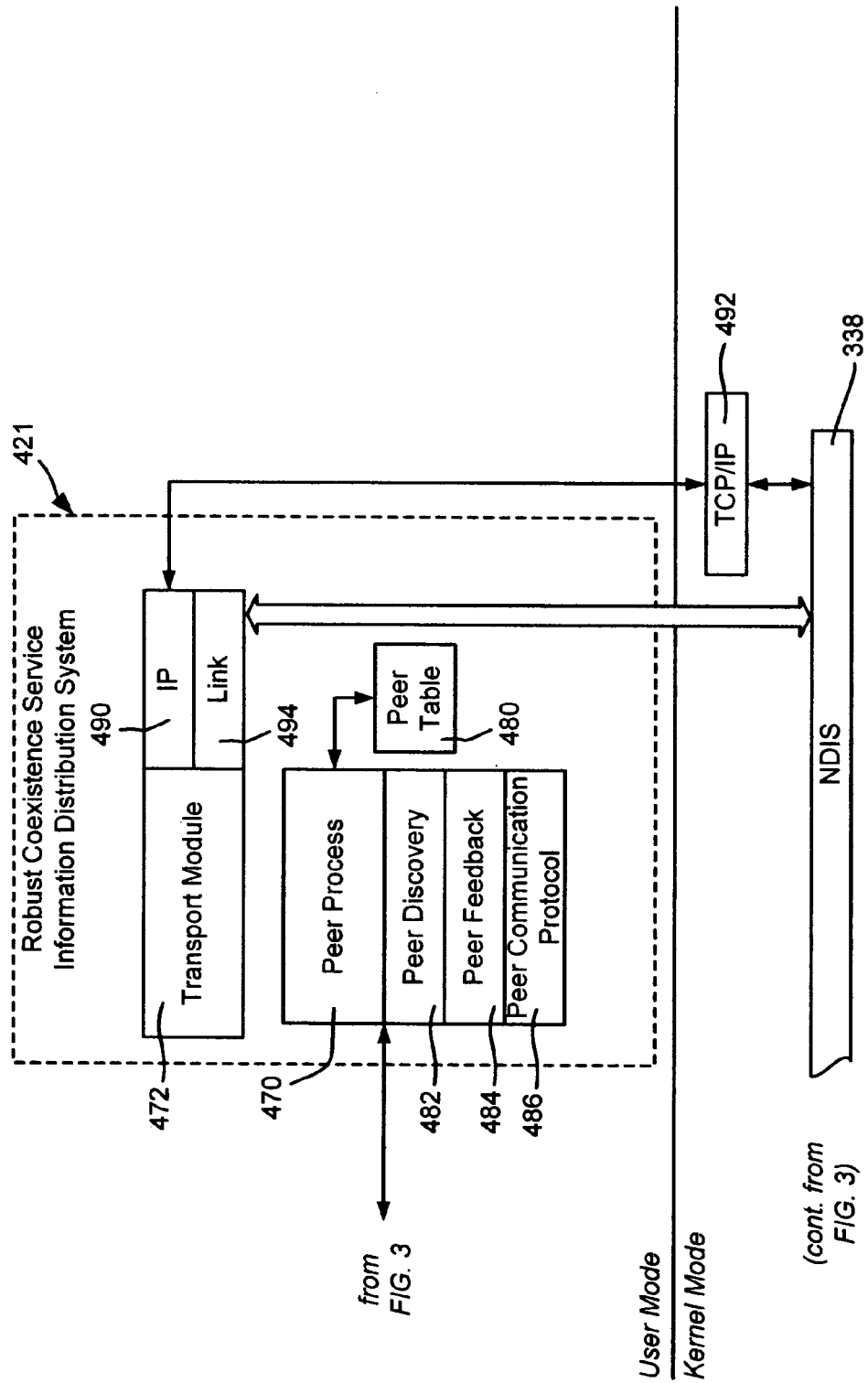
FIG. 4 is a block diagram generally representing components connected to information distribution system components of the robust coexistence service, in accordance with various aspects of the present invention.

Turning to FIG. 4, as mentioned above, another subsystem component of the robust coexistence service comprises a information distribution service 421 that communicates interference information sensed at the local computer system to other remote devices on the network, and receives similar information sensed remotely, for use in locally mitigating interference. As represented in FIG. 4, the information distribution service 421 includes a peer process 470 and a transport module 472.

The peer process manages a peer table 480 and performs tasks including peer discovery 482, peer feedback 484 and also manages peer communication via a communication protocol 486. In general, peer discovery 482 may use Plug-and-Play (uPnP) technology to discover the wireless nodes that participate in the robust coexistence service, such as handling current audiovisual streams.

Peer feedback 484 is used to communicate the RF environment and other characteristics of each node using the agreed-upon protocol, with updates at appropriate times such as upon interference detection and/or at selected intervals. The communication protocol 486 defines the method, format and the type of RF environment and other characteristics of each node that are to be distributed among the nodes. One suitable protocol is described in the aforementioned related U.S. patent application entitled, "Protocol for Exchanging Control Data to Mitigate Interference Problems in Wireless Networking."

The transport module 472 distributes corresponding protocol packets. One way to transport the packets is to use the IP 490 and the TCP/IP 492 layers, via wired or wireless LANs. Another way is to use a link layer via WLAN or another wireless technology using the same or another wireless band. In this mechanism, packets can be sent on the same channel as the data, or as described in the aforementioned related U.S. patent application entitled, "Use of Separate Control Channel to Mitigate Interference Problems in Wireless Networking," a different channel may be used, in the unlicensed band or even a channel in the licensed band. Note that as described therein, a benefit of using a separate channel for exchanging the control information is that the channel in use for regular data communication may be unable to exchange such control information at times of interference, and thus the control data is also not available for use in mitigation.

Figure 5:
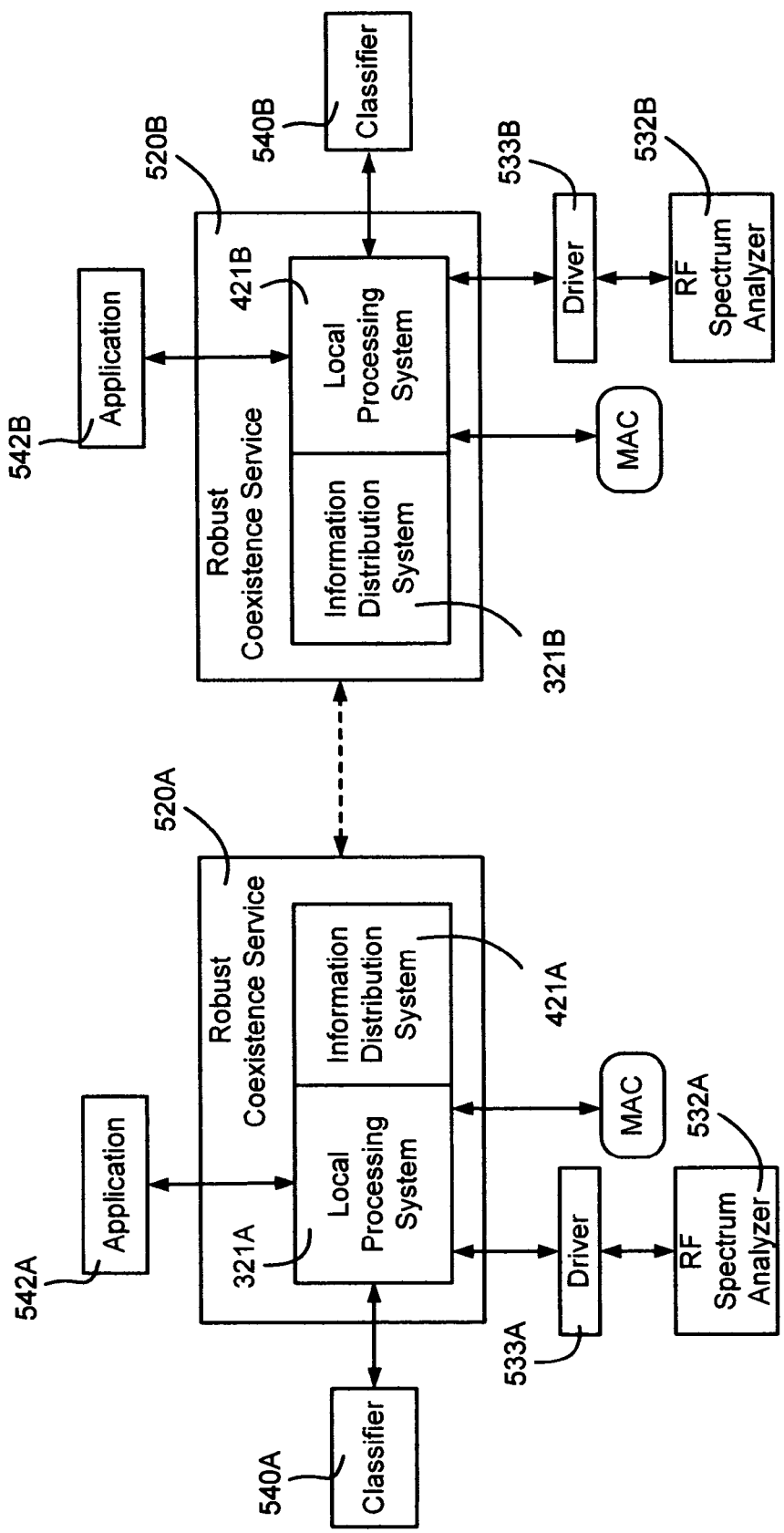
FIG. 5 is a block diagram generally representing two instances of the robust coexistence service communicating sets of RF-related information with one another, in accordance with various aspects of the present invention.

As represented in FIG. 5, in a distributed wireless network with multiple wireless nodes, each node can have one or more spectrum chips 532A and 532B, and a respective instance of an associated robust coexistence service 520A and 520B. Each node may thus aggregate classifier information using its respective information distribution system 421A, 421B, treating other nodes as remote peers.

Another aspect is local peers, enabling collective processing by RCS-enabled wireless nodes, which is based on another robust coexistence-like service running on the same wireless node. This is alternatively represented in FIG. 5, if instead of being considered separate nodes, the services are considered as peers connected and running on the same node. For example, in an environment having more than one spectrum chip in which a per-chip robust coexistence-like service) is being run on the same node, the robust coexistence services 520A and 520B may communicate via their respective information distribution sub-systems 421A and 422B, where they are peers to each other, but local peers, not remote peers.

Figure 6:
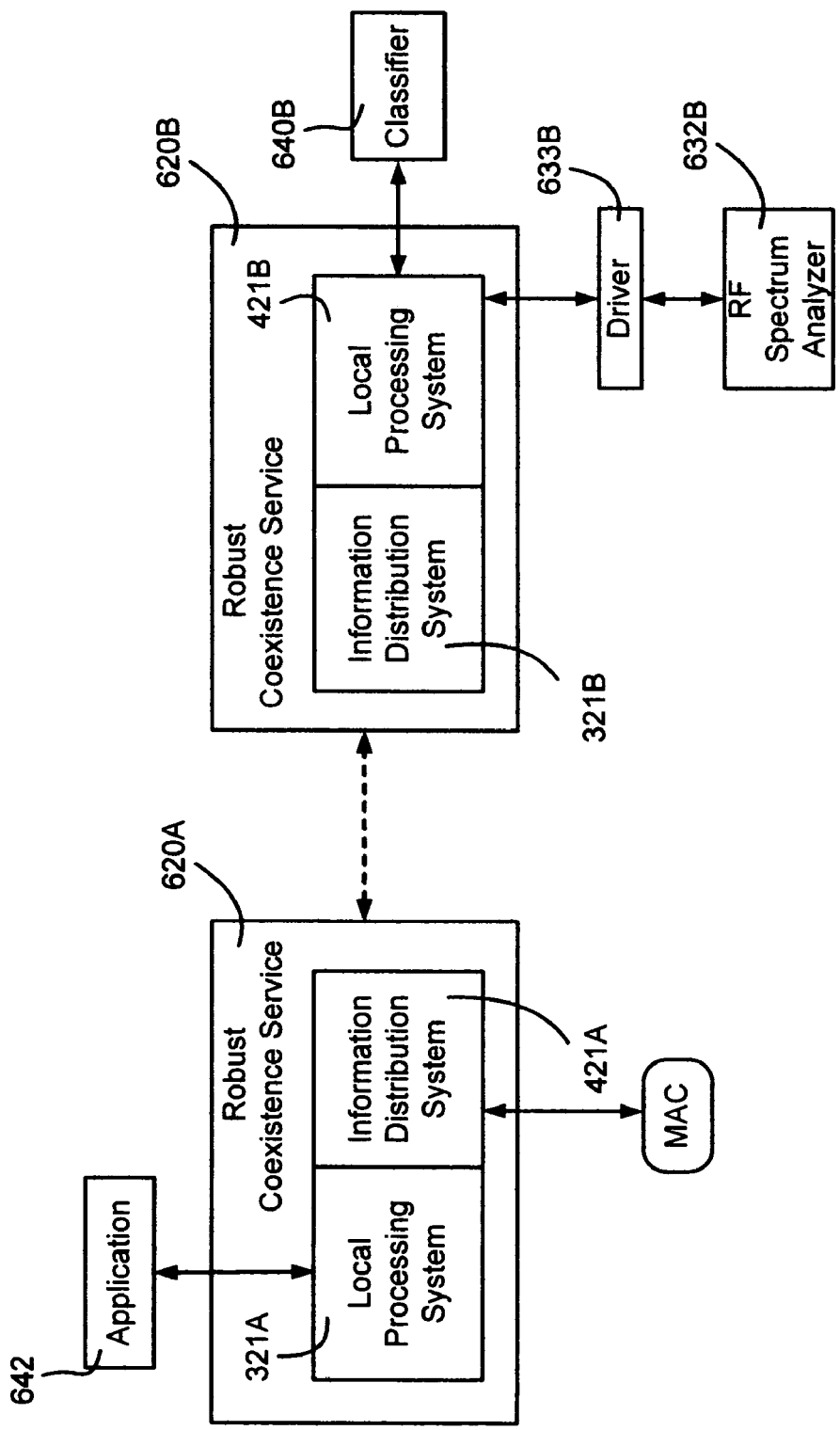
FIG. 6 is a block diagram generally representing two separated instances of the robust coexistence service, where only one of the services has a set of sensed RF-related information, and communicates it to the other service, in accordance with various aspects of the present invention.

Moreover, combining robust coexistence-like services on the same node provides the option of obtaining one fully functional set of components, even if, for example, each robust coexistence service does not have a full set of components that would make it fully functional by itself. Thus, FIG. 6 shows that the application program 642 interfaced to the robust coexistence-like service 620A, along with the MAC connected thereto, complement the classifier 640B, driver 633B and RF spectrum analyzer 632B connected to the robust coexistence service 620B to provide full functionality.

Figure 7:
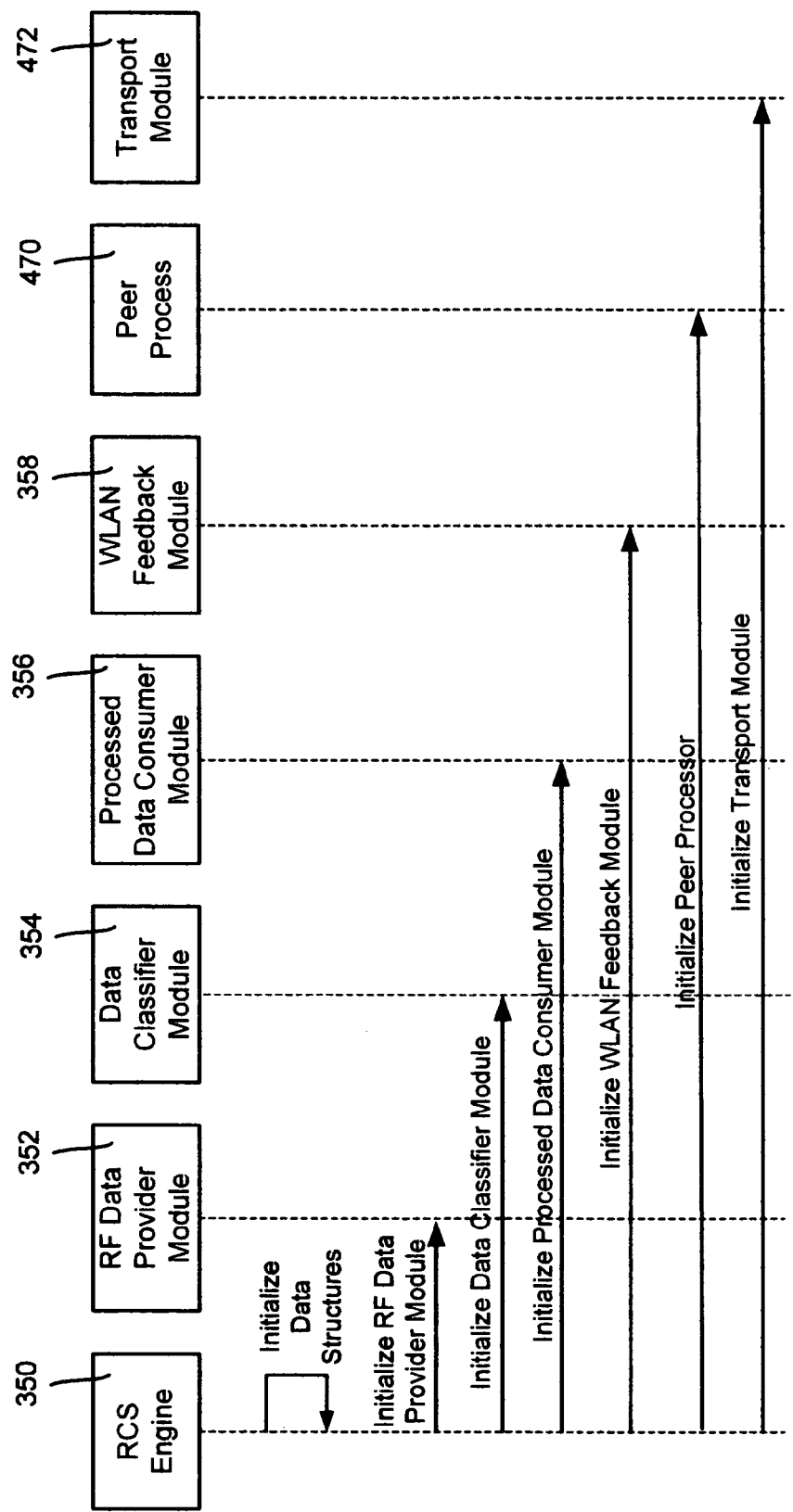
FIGS. 7-10 comprise representations of an example ordering of various robust coexistence service operations, in accordance with various aspects of the present invention.

Turning to an explanation of the basic operation of the robust coexistence service 320, FIG. 7 represents an example over time (not to any scale) that shows the initialization of the various internal modules of the robust coexistence service 320. As can be appreciated, the ordering is not important unless information is needed from one module's initialization to startup and/or completely initialize another. Thus, FIG. 7 represents the robust coexistence service 320 starting the RCS engine 350, and initializing the various other modules, e.g., the RF data provider module 352, the data classifier module 354, the data consumer module 356 and the WLAN feedback module 358. Also, the peer process 470 and transport module 472 are initialized.

Figure 8:
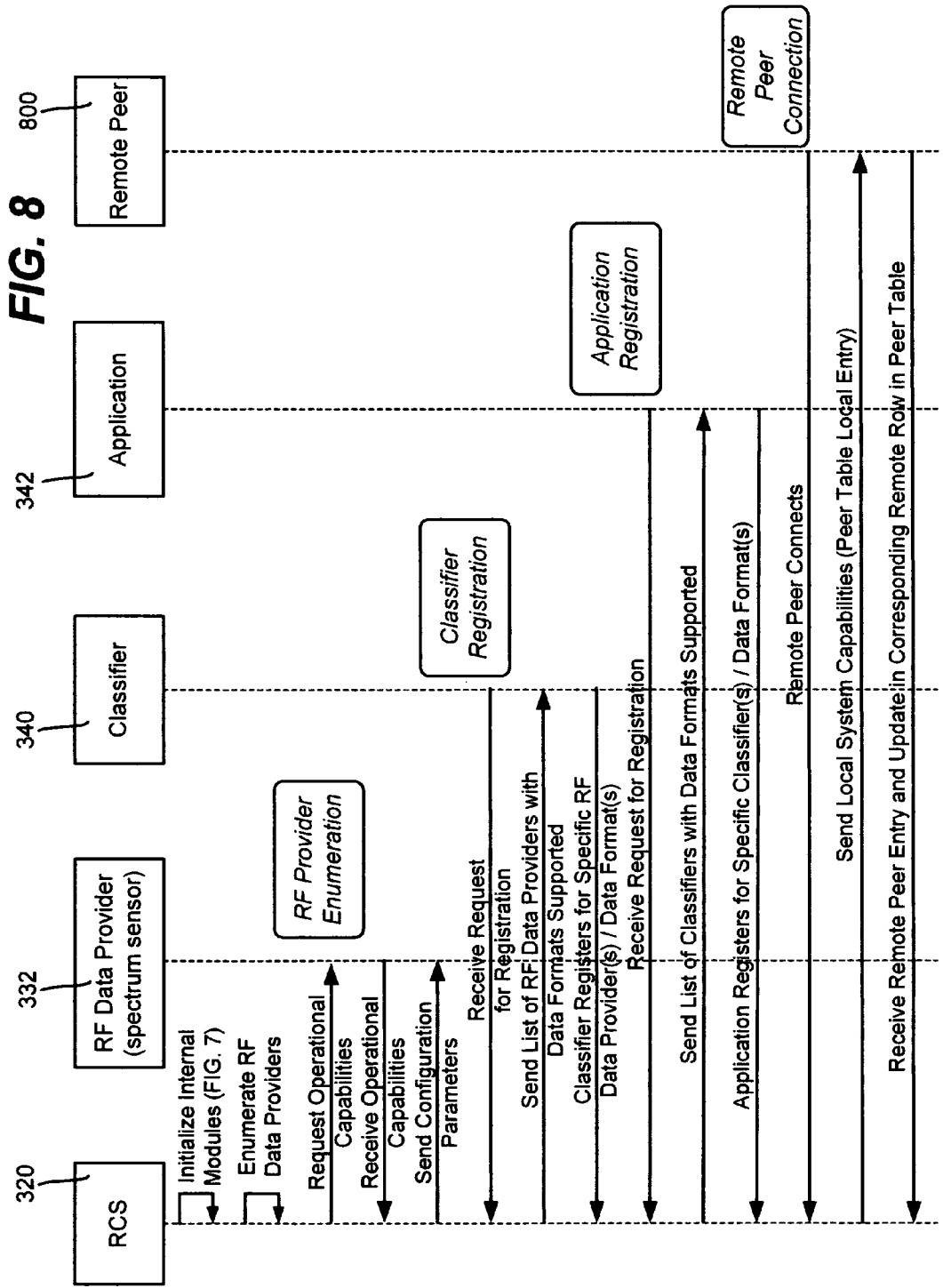

FIG. 8 shows, following internal initialization, the enumeration and registration with an RF spectrum sensor (RF data provider) 332 via its respective driver. The robust coexistence service 320 may select and set the operating parameters of the RF data provider 332, (e.g., bandwidth to detect, channel detection sequence, detection interval and so forth).

As also represented in FIG. 8, the robust coexistence service 320 registers each requesting classifier (e.g., 340), and provides it with a list of the RF spectrum sensors/data providers that were enumerated. In response the data classifier module receives a specific registration request for one or more RF data providers on the list. Application registration and connection to a remote peer 800 are also represented in FIG. 8.

Figure 9:
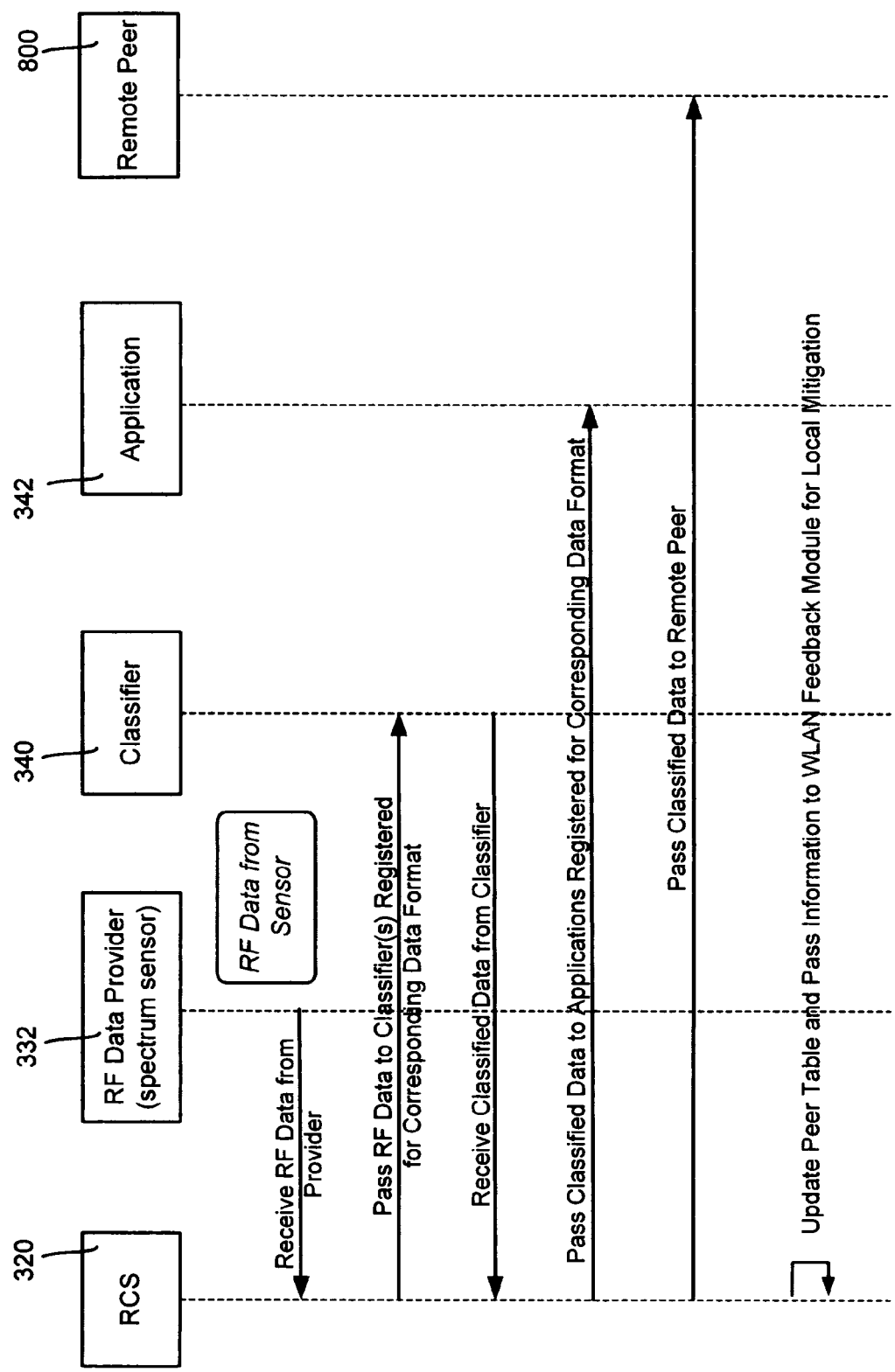

FIG. 9 reiterates the operations when data is received from an RF sensor 332. As described above, the data is provided to an appropriately-registered classifier (e.g., 340), with classified data returned and then forwarded to an appropriately-registered application program 342. Corresponding control data may be passed to any remote peers such as the remote peer 800, and the local peer table updated with local control data based on the classified data. Mitigation information (e.g., as calculated by the robust coexistence service 321 based on the classified data, or the classified data itself) is then sent to the feedback module for use in adjusting the networking parameters to mitigate the interference problem, as described above.

Figure 10:
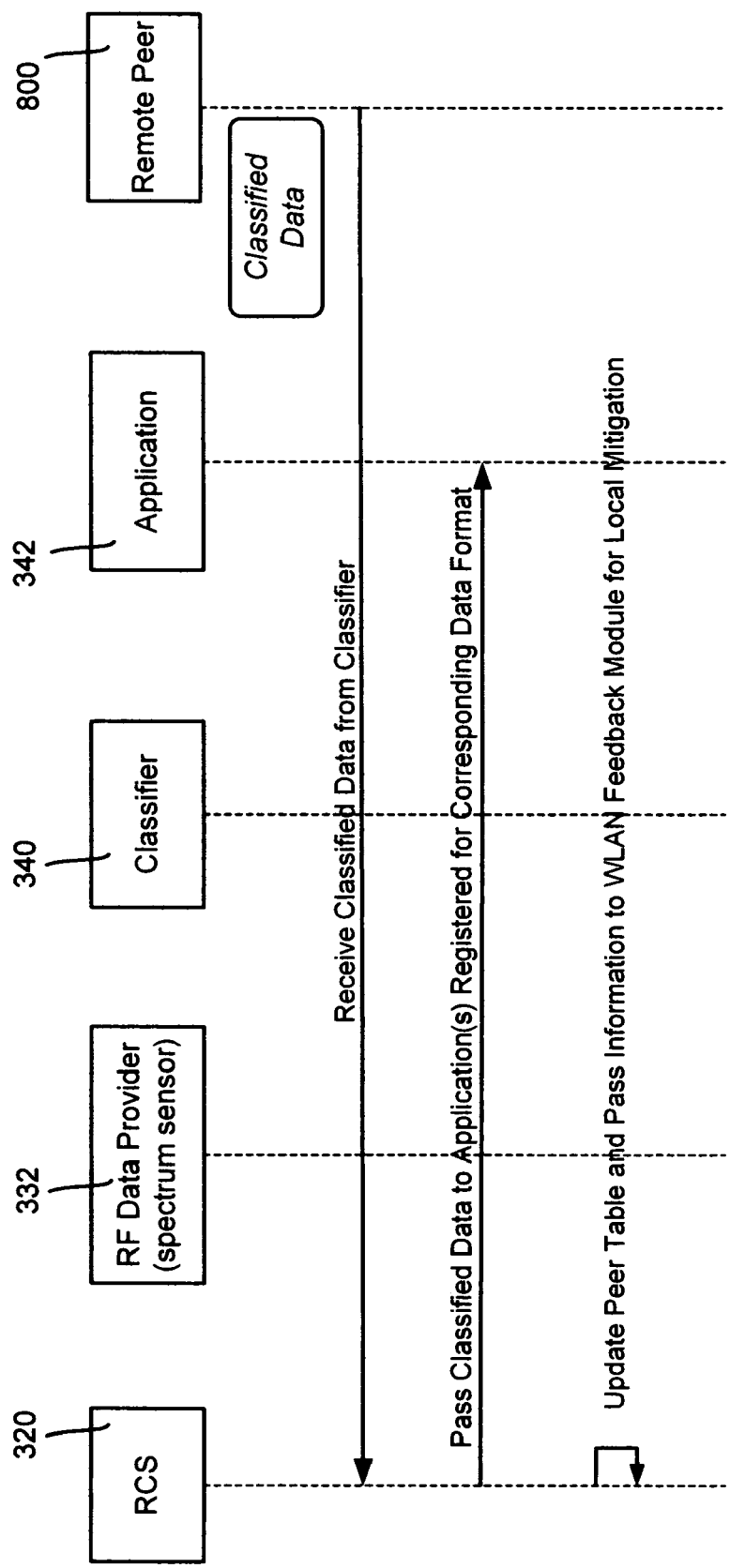

FIG. 10 shows the operations when classified data is received from a remote peer 800. As represented in FIG. 10, this remotely-obtained classified data is passed to the appropriate application program 342 or WLAN miniport Driver 335 (or WLAN NIC 336), which uses the processed data to dynamically adjust the networking parameters to mitigate the interference problem. The peer table is also updated.

As can be seen from the foregoing detailed description, there is provided a flexible and extensible framework that allows components to be interconnected to mitigate the problems caused by interference in the RF spectrum used for wireless network communications. The framework allows for mitigation based on locally-sensed data and remotely-sensed interference data, thereby providing an improved wireless experience, including in the presence of RF interference.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a node computing device within a wireless network that includes a plurality of nodes interconnected through the wireless network and configured to communicate wirelessly with one or more other node computing devices, the node computing devices being susceptible to interference such that wireless nodes may experience interference-related communication problems, a method of mitigating wireless communication problems between the nodes, the method comprising:

at a robust coexistence service (RCS) having various pluggable modules plugged into the RCS, and which RCS runs on a local node computing device, receiving raw RF spectrum data that includes raw data corresponding to interference in an RF environment used for wireless network communications;

providing the raw RF spectrum data to a processing mechanism within the local node computing device that produces processed RF spectrum data which includes a determined solution to mitigate effects of the interference on network communications at the local node computing device, wherein the processing mechanism within the local node computing device takes actions including:

determining that a threshold level of interference has been achieved;

receiving a registration request from a pluggable classifier module;

sending a list of RF data providers with data formats supported to the pluggable classifier module;

receiving a message from the pluggable classifier module for registering with one or more specific RF data providers;

providing raw RF spectrum data to the pluggable classifier module using the one or more specific RF spectrum data providers, the pluggable classifier module being configured to identify raw RF spectrum data characteristics and being pluggable into the local node computing device such that classification of RF spectrum data at the local node computing device is extensible and dependent on classifier modules installed at the local node computing device; and the local node determining that the local node is a first degree peer node relative to one or more remote node computing devices in the wireless network; and in a peer process, feeding the processed RF spectrum data, including the determined solution to networking components of at least one of the one or more remote node computing devices in the wireless network to dynamically control the networking components at the one or more remote node computing devices based on the interference at the local node computing device, wherein mitigation actions in the processed RF spectrum data are extensible dependent on what pluggable application components are installed at the peer, remote node computing device.

2. The method of claim 1 further comprising, registering a component set comprising at least one component of the processing mechanism.

3. The method of claim 1 further comprising storing information corresponding to the classified RF spectrum data for subsequent analysis.

4. The method of claim 1 further comprising, installing a driver for receiving the RF spectrum data from a hardware sensor.

5. The method of claim 1 further comprising, wherein the processing mechanism further receives registration requests from a plurality of pluggable classifier modules as components of the processing mechanism, including receiving information from each classifier corresponding to a type of RF spectrum data that is capable of being classified by that classifier, and wherein providing the RF spectrum data to the processing mechanism comprises routing the RF spectrum data to at least one classifier based on the type of RF spectrum data received.

6. The method of claim 1 further comprising, receiving control data from a remote node computing device in the wireless network, the control data including interference-related information corresponding to that device, providing at least part of the control data to a component that determines another mitigation solution based on the control data, and feeding the other solution to the networking components.

7. At least one computer-readable storage medium having computer-executable instructions, which when executed perform the method of claim 1.

8. In a wireless computing environment including a plurality of nodes configured to communicate wirelessly, the computing environment being susceptible to interference such that wireless nodes may experience interference-related communication problems, a local node that mitigates wireless communication problems between the nodes, the local node comprising:

a processor;

a framework communicatively coupled to, or included within, the processor and that coordinates the mitigation of interference-related problems in wireless network communications, the framework being installed on the local node of the wireless computing environment and including a framework receiving mechanism that receives raw RF spectrum data including interference data obtained via a sensor, the framework receiving mechanism including:

a framework processing mechanism that receives the raw RF spectrum data from the framework receiving mechanism and processes the RF spectrum data into mitigation information by:
  determining when a threshold level of interference has been achieved;
  receiving a registration request from a pluggable classifier module;
  sending a list of RF data providers with data formats supported to the pluggable classifier module;
  receiving a message from the pluggable classifier module for registering with one or more specific RF data providers; and
  providing raw RF spectrum data to the pluggable classifier module using the one or more specific RF spectrum data providers, the pluggable classifier module being configured to identify raw RF spectrum data characteristics and being pluggable into the local node to classify raw RF spectrum data at the local node in a manner that is extensible and depending on classifier modules installed at the local node;

a feedback module that receives at least some of the mitigation information and provides the mitigation information to networking components of the local node for dynamically controlling wireless network communications components to adjust the local node on account of the interference; and a peer processor that runs a peer process communicating at least some of the mitigation information to networking components of remote nodes within the wireless computing environment in a peer-to-peer process, wherein the remote nodes also include the framework that communicates the mitigation of interference-related problems in peer-to-peer wireless network communication.

9. The local node of claim 8 wherein the framework is implemented as a user-mode service running on a computing device.

10. The local node of claim 8 wherein the framework receiving mechanism includes a user-mode data provider module that couples via an interface to a kernel node driver to receive the RF spectrum data.

11. The local node of claim 10 wherein the user-mode data provider module is coupled to the pluggable classifier module into which a classifier component of the processing mechanism registers for processing the RF spectrum data into classified data.

12. The local node of claim 11 wherein the user-mode data provider module is coupled to the data classifier module by a robust coexistence service (RCS) engine.

13. The local node of claim 11 wherein the framework is a coupled to a storage for storing information corresponding to the classified data.

14. The local node of claim 11 wherein the framework includes a consumer module that receives the classified data and provides the classified data to an application program.

15. The local node of claim 14 wherein the consumer module provides the classified data to the application program via the robust coexistence service (RCS) engine.

16. The local node of claim 14 wherein the feedback module receives data corresponding to the mitigation information from the consumer module via the robust coexistence service (RCS) engine.

17. The local node of claim 8 further comprising a triggering mechanism that activates the framework when a level of RF spectrum data is detected.

18. The local node of claim 8 wherein the framework further includes an information distribution subsystem for exchanging interference-related control data with a remote node of the wireless network.

19. The local node of claim 18 wherein the information distribution subsystem maintains a peer table comprising control data received from the remote node.

20. The local node of claim 18 wherein the information distribution subsystem provides at least part of the control data received from the remote node to a local component that determines other mitigation information for dynamically controlling wireless network communications to adjust for the interference on the local node.

21. The local node of claim 18 wherein the remote node comprises a computer system.

22. The local node of claim 18 wherein the remote device comprises an access point.

23. The method of claim 1, wherein the method further comprises:

receiving processed RF spectrum data from a remote node computing device;

the processing mechanism considering the raw RF spectrum data obtained at the local node computing device and the processed RF spectrum data from the remote node computing device in producing, at the local node, processed RF spectrum data with a determined solution to mitigate effects of interference on network communications at the local node computing device and at the remote node computing device;

receiving a first registration request from a pluggable application component;

sending a list of classifiers that have previously registered with a communication service at the local node computing device to the pluggable application component;

receiving a second registration request from the pluggable application component requesting to register for specific classifiers an data formats;

providing RF spectrum data to the pluggable application component at the local node using data formats identified in the second registration request from the pluggable application component, and such that mitigation actions determined at the local node computing device are extensible dependent on what pluggable application components are installed at the local node computing device; and provide a viewable notification to a user of the local node computing device regarding RF spectrum data and classification of the RF spectrum data.

\* \* \* \* \*